(12) United States Patent
Nissov et al.

(10) Patent No.: US 7,924,497 B2
(45) Date of Patent: Apr. 12, 2011

(54) SYSTEM AND METHOD FOR GAIN EQUALIZATION AND OPTICAL COMMUNICATION SYSTEM INCORPORATING THE SAME

(75) Inventors: Morten Nissov, Ocean, NJ (US); Alexei N. Pilipetskii, Colts Neck, NJ (US); Alan J. Lucero, East Brunswick, NJ (US)

(73) Assignee: Tyco Electronics Subsea Communications LLC, Morristown, NJ (US)

( * ) Notice: Subject to any disclaimer, the term of this patent is extended or adjusted under 35 U.S.C. 154(b) by 134 days.

(21) Appl. No.: 11/534,026

(22) Filed: Sep. 21, 2006

(65) Prior Publication Data

US 2008/0074734 A1   Mar. 27, 2008

(51) Int. Cl.
H04B 10/17 (2006.01)
H04B 10/12 (2006.01)
H01S 3/30 (2006.01)

(52) U.S. Cl. .................................. 359/334; 359/337.1
(58) Field of Classification Search ............... 359/334, 359/337.1
See application file for complete search history.

(56) References Cited

U.S. PATENT DOCUMENTS

| | | | |
|---|---|---|---|
| 5,920,424 A | 7/1999 | Espindola et al. | |
| 6,038,356 A * | 3/2000 | Kerfoot et al. | 385/24 |
| 6,172,803 B1 * | 1/2001 | Masuda et al. | 359/337.12 |
| 6,359,726 B1 | 3/2002 | Onaka et al. | |
| 6,396,623 B1 * | 5/2002 | Wysocki et al. | 359/337.4 |
| 6,396,624 B1 | 5/2002 | Nissov et al. | |
| 6,429,966 B1 * | 8/2002 | Hazell et al. | 359/341.41 |
| 6,525,872 B1 | 2/2003 | Ziari | |
| 6,556,345 B1 * | 4/2003 | Gassner et al. | 359/341.4 |
| 6,657,774 B1 * | 12/2003 | Evans et al. | 359/334 |
| 6,665,114 B2 * | 12/2003 | Benjamin et al. | 359/334 |
| 6,697,189 B2 * | 2/2004 | Courtois et al. | 359/337.1 |
| 6,724,524 B1 | 4/2004 | Evans | |
| 6,785,042 B1 | 8/2004 | Onaka et al. | |
| 6,888,670 B2 * | 5/2005 | Oh et al. | 359/334 |
| 6,975,446 B2 * | 12/2005 | Takeda et al. | 359/337.1 |
| 7,034,994 B2 * | 4/2006 | McNicol | 359/337.5 |
| 7,038,843 B2 | 5/2006 | Denkin et al. | |
| 2002/0071173 A1 | 6/2002 | Lee | |
| 2002/0085268 A1 * | 7/2002 | Zarris et al. | 359/334 |
| 2002/0131160 A1 * | 9/2002 | McNicol | 359/337.5 |
| 2002/0149838 A1 * | 10/2002 | Wang et al. | 359/334 |
| 2002/0159131 A1 * | 10/2002 | Bartolini et al. | 359/334 |
| 2003/0016439 A1 * | 1/2003 | Courtois et al. | 359/337.4 |

(Continued)

FOREIGN PATENT DOCUMENTS

CN 2631132 Y 8/2004

OTHER PUBLICATIONS

International Search Report and Written Opinion dated Sep. 18, 2008 issued in related International Patent Application No. PCT/US0779006.

(Continued)

*Primary Examiner* — Eric Bolda
(74) *Attorney, Agent, or Firm* — Grossman, Tucker, Perreault & Pfleger, PLLC (57) ABSTRACT

An optical amplifier including gain equalization and system incorporating the same. The amplifier includes a Raman portion and an EDFA portion with a gain flattening filter coupled between the Raman portion and the EDFA.

19 Claims, 4 Drawing Sheets

U.S. PATENT DOCUMENTS

| | | | |
|---|---|---|---|
| 2003/0021009 A1* | 1/2003 | MacCormack et al. | 359/337 |
| 2003/0142392 A1 | 7/2003 | Strutz | |
| 2003/0161030 A1* | 8/2003 | Oh et al. | 359/334 |
| 2003/0161031 A1* | 8/2003 | Benjamin et al. | 359/337.4 |
| 2003/0165007 A1* | 9/2003 | Frolov et al. | 359/337.4 |
| 2003/0179440 A1* | 9/2003 | Foursa et al. | 359/334 |
| 2004/0190118 A1* | 9/2004 | Akasaka | 359/333 |
| 2004/0196532 A1* | 10/2004 | Evangelides et al. | 359/334 |
| 2004/0196539 A1* | 10/2004 | Chang et al. | 359/341.41 |
| 2004/0240042 A1 | 12/2004 | Charlet | |
| 2005/0078354 A1* | 4/2005 | Chang et al. | 359/334 |

OTHER PUBLICATIONS

Chinese Office Action dated Jul. 26, 2010 issued in related Chinese Patent Application No. 200780035210.

* cited by examiner

SYSTEM AND METHOD FOR GAIN EQUALIZATION AND OPTICAL COMMUNICATION SYSTEM INCORPORATING THE SAME

TECHNICAL FIELD

The present application relates to the optical transmission of information and, more particularly, to a system and method for gain equalization and an optical communication system incorporating the same.

BACKGROUND

Long-haul optical communication systems e.g. systems of lengths greater than about 600 kilometers, suffer from signal attenuation resulting from a variety of factors, including scattering, absorption, and bending. To compensate for attenuation, long-haul systems may include a series of optical amplifiers spaced along the transmission path between a transmitter and a receiver. The amplifiers amplify the optical signal in a manner allowing reliable detection at the receiver.

Erbium doped fiber amplifiers (EDFAs) have proven particularly useful in long-haul systems. In general, an EDFA includes an erbium-doped fiber segment that is "pumped" with light from one or more pump sources. The pump source, e.g. a laser, excites erbium atoms in the doped segment, which then serve to amplify the optical signal passing therethrough.

Raman amplifiers are also known. Raman amplification occurs throughout an optical transmission fiber segment when it is pumped at an appropriate wavelength or wavelengths. Each Raman amplifier may contain one or more pumps. Gain is achieved over a spectrum of wavelengths longer than the pump wavelength through the process of Stimulated Raman Scattering. Although the power efficiency associated with Raman amplifiers is less than that achieved by EDFAs, Raman amplifiers may provide better noise performance by means of distributed amplification in the transmission fiber.

Hybrid Raman/EDFA (HRE) amplifiers combine the features of both Raman and EDFA amplifiers. In a HRE a Raman portion typically acts as a pre-amplifier before an EDFA. The addition of Raman amplification to an EDFA configuration allows for an economical increase in spacing between amplifiers on the transmission path compared to use of EDFAs alone.

In a wavelength division multiplexed (WDM) optical communication system several optical signals are transmitted on the same fiber at different wavelengths/channels. Ideally, the optical amplifiers in a WDM system should amplify each channel within the system bandwidth at the same level of gain. If the transmitted channels are non-uniformly amplified, channels may ultimately be lost due to progressive under-amplification as they propagate in the transmission path.

Unfortunately, EDFAs and Raman amplifiers, and consequently HREs, exhibit non-flat gain characteristics across the system bandwidth associated with WDM systems. Gain flattening or gain equalization may, however, be achieved by the use of gain flattening filters. Gain flattening filters render the gain level substantially flat across the system bandwidth. In a multi-stage EDFA, for example, a gain flattening filter may be provided between EDFA stages. In HRE configurations, where the EDFA is often of a single-stage design, gain flattening filters have been provided at the output of the EDFA portion of the HRE.

Long-haul undersea systems may consist of very long spans and subsequently be pump power limited. That is, the pump power available for an amplifier may be practically limited to a maximum level below that which would be necessary to achieve optimum transmission performance. In such a system incorporating HREs, in order to receive the full benefits of Raman pre-amplification, it may be desirable to make efficient use of the limited pump power.

Figure 6:
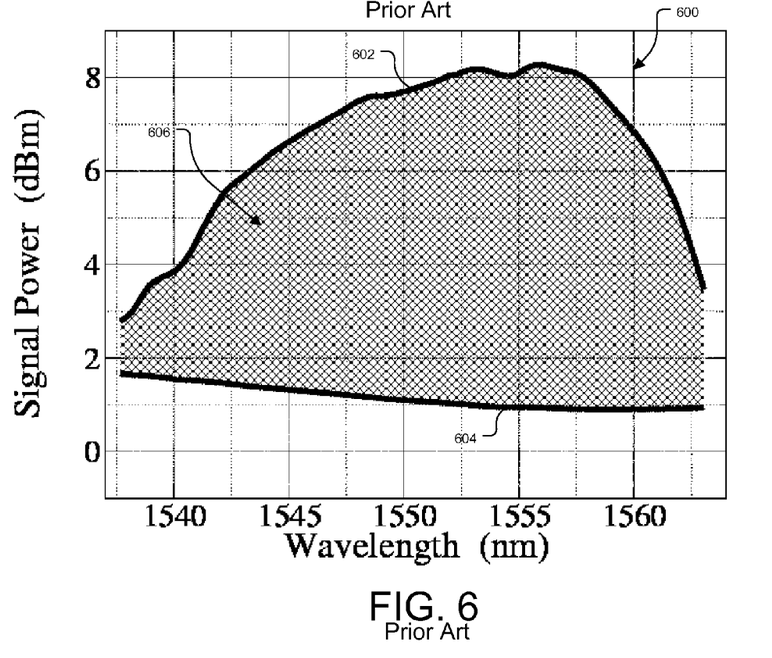
FIG. 6 includes plots of signal power vs. wavelength illustrating the power lost in a prior art configuration using post-filtering.

Providing gain flattening filters at the output of the EDFA portion of an HRE (referred to herein as post-filtering), however, results in filtering of a significant portion of the power imparted by the EDFA section, effectively wasting pump power. FIG. 6, for example, includes plots 600 of signal power vs. wavelength illustrating the power lost in equalization using a post-filtering approach. Plot 602 illustrates an EDFA output power spectrum provided at the input of a gain flattening filter, and plot 604 illustrates the power spectrum at the output of the gain flattening filter. The region 606 between plot 602 and plot 604 represents the loss in signal power resulting from post-filtering. As shown, although the power spectrum 604 at the output filter is flattened compared to the power spectrum 602 at the input of the filter, gain flattening is achieved with a significant loss of signal power. In the illustrated exemplary embodiment, 5.65 dBm of signal power is effectively wasted by a post-filtering approach.

There is therefore a need for a system and method for gain equalization in a hybrid Raman/EDFA used in long-haul undersea WDM optical communication systems that allows for more efficient use of amplifier pump power. There is also a need for an undersea WDM optical communication system incorporating such a system.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
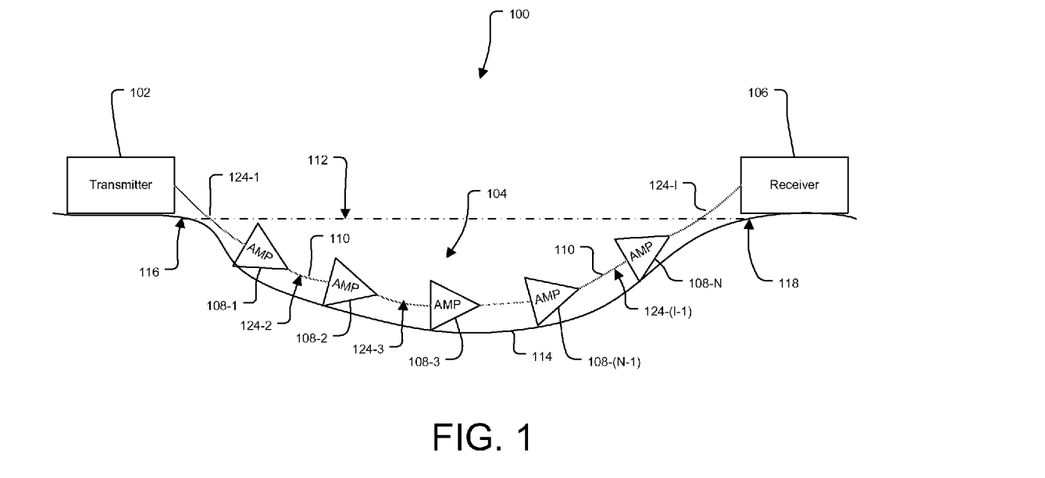
FIG. 1 is a simplified block diagram of one exemplary embodiment of an optical communication system consistent with the present invention.

Turning now to FIG. 1, there is illustrated an exemplary optical communication system 100 consistent with the present invention. Those skilled in the art will recognize that the system 100 has been depicted as a highly simplified point-to-point system for ease of explanation. It is to be understood the present invention may be incorporated into a wide variety of optical networks and systems.

The illustrated exemplary optical communication system 100 includes a transmitter 102 and a receiver 106 connected via an optical transmission path 104. At the transmitter 102, a plurality of separate optical signals may be generated by modulating data on each of a plurality of different wavelengths/channels within a signal bandwidth. The transmitter 102 may combine the separate channels into an aggregate optical signal and transmit the aggregate optical signal over the optical information path 104 to the receiver 106. Although the system 100 is illustrated as including a distinct transmitter 102 and receiver 106, those of ordinary skill in the art will recognize the transmitter 102 and receiver 106 may each be configured as a transceiver to facilitate bi-directional communication over the optical information path.

Depending on system characteristics and requirements, the optical transmission path 104 may include, optical transmission fiber 110, optical amplifiers/repeaters 108-1, 108-2, 108-3, 108-(N-1), 108-N consistent with the present invention, optical filters, and other active and passive components. For clarity, only optical amplifiers/repeaters 108-1, 108-2, 108-3, 108-(N-1), 108-N and optical transmission fiber 110 are illustrated in the optical information path 104. Optical amplifier configurations consistent with the present invention will be described in greater detail herein. Configurations for other components included in the transmission path are known to those of ordinary skill in the art.

System 100 may be configured as a long-haul system, e.g. having a length from the transmitter to receiver of more than about 600 km, and may span a body of water 112. When used to span a body of water, e.g. an ocean, amplifiers/repeaters 108-1, 108-2, 108-3, 108-(N-1), 108-N may be seated on the ocean floor 114 and the transmission path 104 may span between beach landings 116, 118 to extend from the water 112 for coupling to the transmitter 102 and receiver 106. It will be appreciated that a plurality of optical transmission components may be coupled to the transmission path 104 and may be disposed beneath water and/or over land.

In general, the distance between optical amplifiers defines a transmission span length. The illustrated exemplary embodiment includes a plurality of spans, 124-1, 124-2, 123-3 . . . 124-(I-1), 124-I. Those or ordinary skill in the art will recognize that span lengths may vary significantly in a particular system. In a long-haul system, for example, some spans may be as short as 20 kilometers, while some spans may exceed 100 km. In view of the span length variation, signal attenuation varies from span-to-span.

Figure 2:
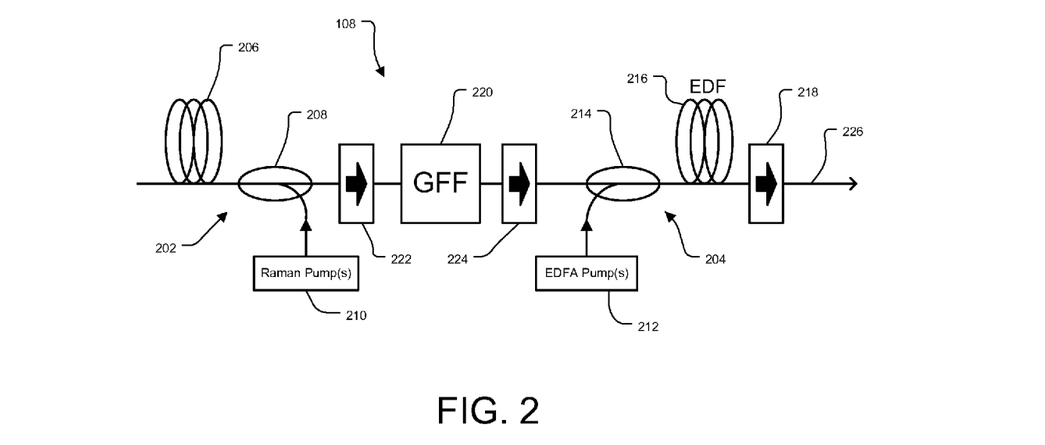
FIG. 2 is block diagram of one exemplary hybrid Raman/EDFA amplifier consistent with the present invention.

The amplifiers 108-1, 108-2, 108-3, 108-(N-1), 108-N may be configured to compensate for the signal attenuation by amplifying the optical signal wavelengths in the signal bandwidth. One exemplary embodiment of an amplifier 108 consistent with the present invention is illustrated in FIG. 2. The illustrated exemplary embodiment is configured as a hybrid Raman/EDFA amplifier (HRE) including a Raman amplifier portion 202 and an EDFA portion 204. The Raman portion 202 may include a transmission fiber segment 206 in which Raman gain is generated for amplifying an optical signal propagating through the path 104. Energy from one or more Raman pump sources 210 may be coupled to the segment 206 of transmission fiber 110 by a coupler 208. The EDFA portion 204 may be a single or multi-stage EDFA, and may include one or more EDFA pump sources 212, a coupler 214, an erbium-doped fiber segment 216, and an isolator 218. Various configurations for Raman and EDFA pump sources that may be controlled locally or remotely are known to those of ordinary skill in the art. Also, the pump sources may be coupled to the optical path 104 in a known configuration.

The illustrated exemplary embodiment includes a gain flattening filter (GFF) 220 coupled between the Raman portion 202 and the EDFA portion 204 (referred to herein as pre-filtering). As shown, the output of the Raman portion 202 is optically coupled to the input of the GFF through an isolator 222 and the input of the EDFA portion 204 is optically coupled to the output of the GFF through an isolator 224. In general, the GFF receives the amplified output of the Raman portion and provides an input to the EDFA portion having a reshaped spectrum compared to the input received by the GFF from the Raman portion. The GFF insertion loss profile may be designed to flatten the combined gain shapes of the Raman and EDFA sections. For example, the transmittance characteristics of the GFF may be selected in consideration of the gain characteristics of the Raman 202 and EDFA 204 gain portions such that amplification of the output of the GFF by the EDFA portion 204 provides an amplifier output 226 that is flattened to a desired level.

A variety of GFF configurations including one or more separate filter elements for reducing the gain vs. wavelength variation of a signal applied to an input thereof are known. The extent of gain flattening achieved by a GFF in particular application consistent with the present invention may be highly dependent on the total gain shape of the input to the filter, the specific filter configuration, etc. In one embodiment, gain may be flattened to exhibit a variation of less than about 1 dB peak-peak. For amplifiers with large amounts of gain compensating losses of very long spans, the flattened gain variation may be worse compared to cases with shorter spans.

Positioning a GFF between a Raman portion and an EDFA portion of an HRE and avoiding a GFF at the output of an EDFA portion, as shown for example in FIG. 2, allows the HRE to provide high signal power into the optical transmission path using reasonable pump powers. In a long-haul undersea system available pump power for pumping an EDFA portion of an HRE may be practically limited to less than about 400 mW. In one exemplary embodiment of a system consistent with the present invention, transmission spans in excess of 120 km may be achieved using a pump power for the EDFA portion of less than about 400 mW.

Figure 3:
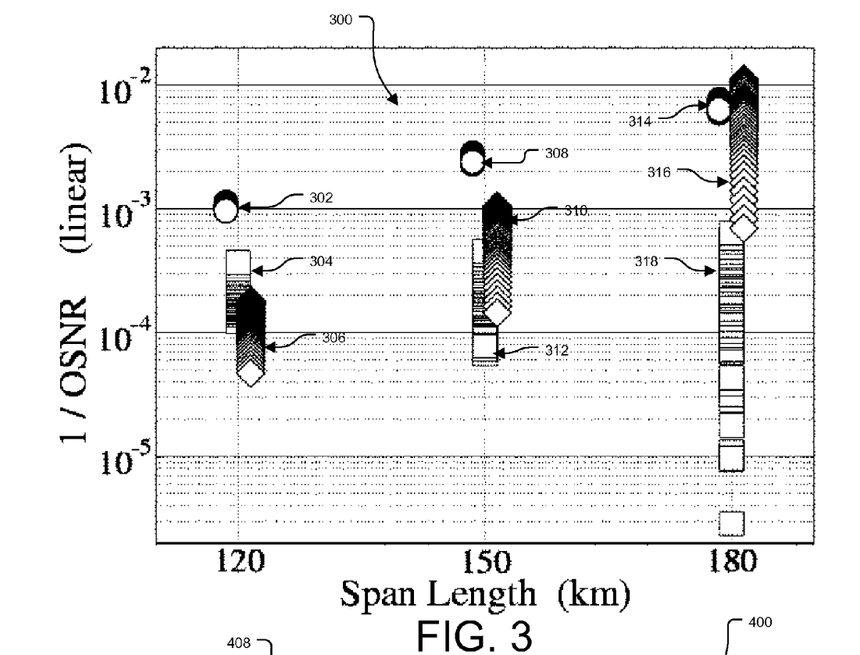
FIG. 3 includes plots of the reciprocal of optical signal to noise ratio (1/OSNR) vs. span length showing the levels of ASE and MPI generated by the Raman and EDFA portions of a hybrid Raman/EDFA consistent with the present invention.

These advantages in pump power efficiency may be achieved without significantly degrading the total noise performance of the amplifier compared to a configuration wherein a GFF is provided at the output of the EDFA portion. Contributors to noise generated by an HRE include amplified spontaneous emission (ASE) noise generated in the Raman and EDFA portions and multi-path interference (MPI) generated in the Raman portion. FIG. 3 includes plots 300 on a log scale of simulated reciprocal of optical signal to noise ratios (1/OSNR) vs. span length showing the levels of ASE and MPI generated by the Raman and EDFA portions of pre-filtered HREs designed for 96 channels, consistent with the present invention. In the plots 300, each marker represents a channel. The circular markers 302, 308, and 314 illustrate the ASE generated in the Raman portion of the HRE, the square markers 304, 312, and 318 illustrate the ASE generated in the EDFA portion of the HRE, and the diamond markers 306, 310 and 316 illustrate the MPI generated in the Raman portion of the HRE.

As shown, for span lengths of 120 km or more the ASE noise from the Raman portion of the HRE is dominant over the ASE noise from the EDFA portion of the HRE. As the span length increases beyond 120 km, the EDFA portion exhibits a more extreme gain shape and a wider range of OSNR, but the ASE generated in the Raman portion remains more than twice the level of the ASE in the EDFA. When noise from the Raman portion dominates the noise from the EDFA portion, providing a GFF between a Raman portion and an EDFA portion has minimal adverse impact on the total amplifier noise performance compared to providing a GFF at the output of the EDFA portion. Thus, when a configuration consistent with the invention is used in such systems higher signal power may be launched into the transmission path using reasonable pump powers and without significantly degrading the total noise performance of the system.

Figure 4:
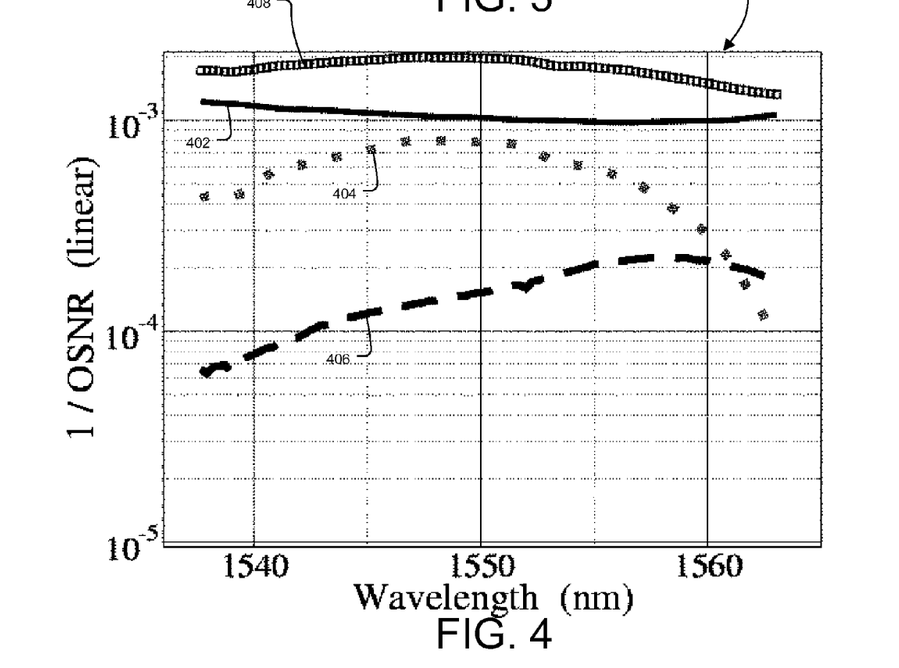
FIG. 4 includes plots of the reciprocal of optical signal to noise ratio (1/OSNR) vs. wavelength showing the levels of ASE and MPI generated by the Raman and EDFA portions of a hybrid Raman/EDFA amplifier consistent with the present invention.
Figure 5:
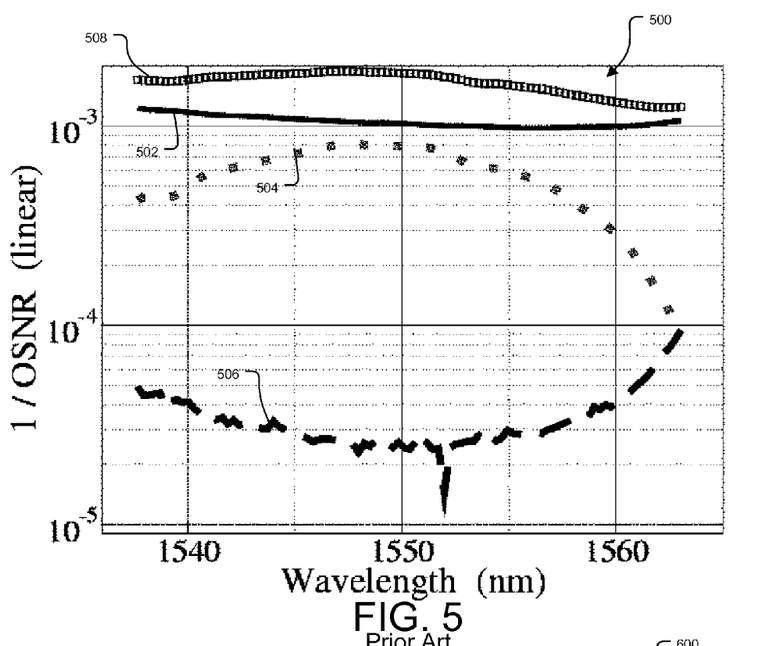
FIG. 5 includes plots of the reciprocal of optical signal to noise ratio (1/OSNR) vs. wavelength showing the levels of ASE and MPI generated by the Raman and EDFA portions of a prior art hybrid Raman/EDFA amplifier using post-filtering.

FIG. 4, for example, includes plots 400 on a log scale of the reciprocal of optical signal to noise ratio (1/OSNR) vs. wavelength for a 150 km HRE employing pre-filtering consistent with the present invention. Plots 402 and 404 show the levels of ASE and MPI, respectively, generated by the Raman portion and plot 406 shows the level of ASE generated by the EDFA portion. Plot 408 shows the total amplifier noise performance resulting from the Raman ASE 402 and MPI 404 and the EDFA ASE 406. FIG. 5 includes plots 500 on a log scale of the reciprocal of optical signal to noise ratio (1/OSNR) vs. wavelength for a HRE employing post-filtering. Plots 502 and 504 show the levels of ASE and MPI, respectively, generated by the Raman portion and plot 506 shows the ASE generated by the EDFA portion. Plot 508 shows the total amplifier noise performance resulting from the Raman ASE 502 and MPI 504 and the EDFA ASE 506. The plots set forth in FIGS. 4 and 5 were generated using data derived from simulated system including 96 channels using HREs with a total launch power of 21 dBm, calculated for a single amplifier. The Raman portion of the simulated HRE was pumped at 1450 nm and the EDFA portion was pumped at 980 nm. The GFFs in the simulated systems contributed an average loss of 5.3 dB in the illustrated signal bandwidth and a peak loss of 7.9 dB.

To achieve the required launch power for the system associated with FIG. 4 wherein the GFF was coupled between the Raman and EDFA portions, the EDFA pump power was set at 295 mW. To achieve the required launch power for the system associated with FIG. 5 wherein the GFF was provided at the output of the EDFA portion, the EDFA pump power was set at 1072 mW. As shown in FIGS. 4 and 5, the noise contributions from the Raman portion 402, 404 and 502, 504 were dominant relative to the ASE noise generated by the EDFA 406, 506, and do not change with location of the GFF. There is an improvement in the ASE noise generated by the EDFA when the GFF is placed after the EDFA portion, as shown in FIG. 5, but, as shown in plots 408 and 508, the total noise performance of the systems associated with FIGS. 4 and 5 is nearly identical. A system consistent with the present invention thus allows use of significantly less pump power than a system including a GFF at the output of an EDFA portion without significantly effecting system noise performance. When pump power is limited, e.g. in a long-haul undersea system, the efficiencies associated with a system consistent with the present invention may provide a significant advantage in system reach compared to a system including a GFF at the output of an EDFA portion.

Figure 7:
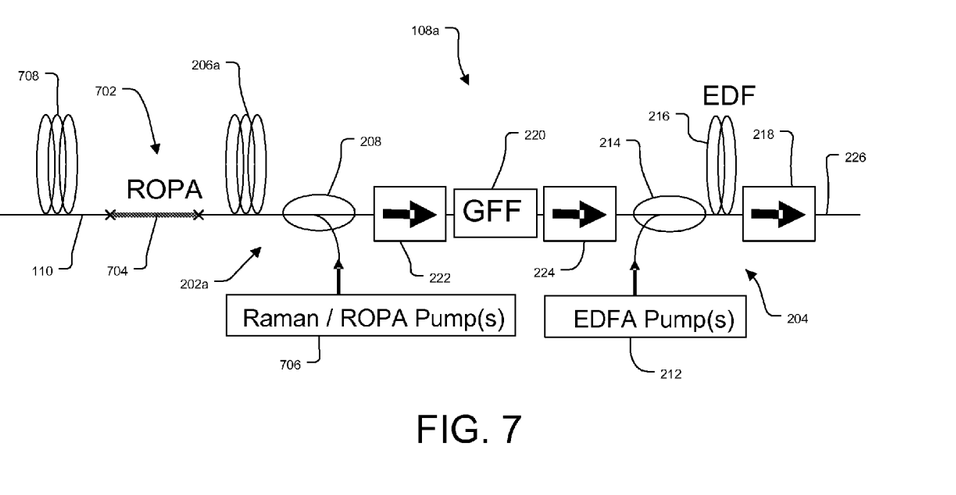
FIG. 7 is block diagram of another exemplary amplifier consistent with the present invention.

Benefits of pre-filtering consistent with the present invention may also be achieved in a system including a remote optical pumped amplifier (ROPA). FIG. 7, for example, illustrates an amplifier/repeater configuration 108a wherein Raman gain generated in a segment of transmission fiber 206a of a Raman portion 202a is supplemented by gain from a ROPA 702. ROPA configurations are known to those of ordinary skill in the art, and generally include a doped fiber segment 704, e.g. an erbium doped fiber segment, embedded in the transmission fiber 110. In the illustrated exemplary embodiment the doped fiber segment 704 is disposed between transmission fiber segments 708 and 206a.

One or more pump sources may pump the transmission fiber segment 206a and the doped fiber segment 704 for amplifying an optical signal propagating through the segments. In the illustrated exemplary embodiment, a single Raman/ROPA pump source 706 is provided in the amplifier/repeater 108a. Energy for pumping both the segment 206a and the doped segment 704 may be coupled from the pump source 706 by a coupler 208. As an optical signal propagates through the transmission fiber, gain is imparted to the signal through pumping of the doped fiber segment 704 and Raman gain is imparted through pumping of the transmission fiber segment 206a. In one embodiment, the doped segment 704 of the ROPA may be physically located in the transmission path at a distance of 20-120 km from the pump source 706. Although a single Raman/ROPA pump source 706 is illustrated, separate pump sources may be provided for the Raman portion 202a and the ROPA 702. Also, the Raman and/or ROPA pump sources may be physically located in a repeater, e.g. 108a, or in a system terminal 102 or 106.

In the illustrated exemplary embodiment 108a a gain flattening filter (GFF) 220 is provided between the Raman portion 202a and an EDFA portion 204 to provide pre-filtering. Since the total amplifier noise may be dominated by the ROPA and Raman ASE noise components, pre-filtering while avoiding a GFF at the output of the EDFA portion 204 provides benefits associated with pump power efficiency, as described above.

According to one aspect of the present invention, therefore, there is provided an optical communication system including a transmitter configured to transmit an aggregate optical signal including plurality of optical signals at different associated wavelengths in a signal bandwidth; a receiver configured to receive the aggregate optical signal and detect data modulated on the plurality of optical signals; and a transmission path extending between the transmitter and the receiver. The transmission path includes at least one amplifier. The amplifier includes: a Raman portion including a transmission path segment configured to be pumped by at least one Raman pump to impart Raman gain to at least a portion of the signal bandwidth, an EDFA portion including at least one an erbium-doped fiber configured to be pumped by at least one EDFA pump to impart EDFA gain to at least a portion of the signal bandwidth, and a gain flattening filter coupled between the Raman portion and the EDFA portion with no gain flattening filter coupled to an output of the EDFA portion.

According to another aspect of the invention there is provided an optical signal amplifier including: a Raman portion including a transmission path segment configured to be pumped by at least one Raman pump to impart Raman gain to a plurality of wavelengths in a signal bandwidth; an EDFA portion including at least one an erbium-doped fiber configured to be pumped by at least one EDFA pump to impart EDFA gain to a plurality of wavelengths in the signal bandwidth; and a gain flattening filter coupled between the Raman portion and the EDFA portion with no gain flattening filter coupled to an output of the EDFA portion.

According to yet another aspect of the present invention, there is provided a method of amplifying an optical signal to launch the signal on a transmission span of at least 120 km using an amplifier including a Raman gain portion having an output coupled to an input of an EDFA gain portion, including: flattening amplifier gain only between the Raman gain portion and the EDFA gain portion; and pumping the EDFA portion at a pump power less than about 400 mW.

The embodiments that have been described herein are but some of the several which utilize this invention and are set forth here by way of illustration but not of limitation. Many other embodiments, which will be readily apparent to those skilled in the art, may be made without departing materially from the spirit and scope of the invention.

What is claimed is:

1. An optical communication system comprising:
   a transmitter configured to transmit an aggregate optical signal comprising plurality of optical signals at different associated wavelengths in a signal bandwidth;
   a receiver configured to receive said aggregate optical signal and detect data modulated on said plurality of optical signals; and
   a transmission path extending between said transmitter and said receiver, said transmission path comprising,
   at least first and second amplifiers separated by a transmission span of at least 120 km in length, at least the first amplifier being a hybrid Raman/EDFA amplifier comprising:
      a Raman portion comprising a transmission path segment configured to be pumped by at least one Raman pump to impart Raman gain to at least a portion of said signal bandwidth,
      an EDFA portion comprising at least one erbium-doped fiber configured to be pumped by at least one EDFA pump to impart EDFA gain to at least a portion of said signal bandwidth, and
      a gain flattening filter coupled between said Raman portion and said EDFA portion of said hybrid Raman/EDFA with no gain flattening filter coupled to an output of said EDFA portion,
      wherein said at least one Raman pump and said at least one EDFA pump are configured to pump said transmission path segment and said erbium-doped fiber segment, respectively, to achieve an amplifier gain with amplified spontaneous emission (ASE) noise generated by said Raman portion exceeding ASE noise generated by said EDFA portion.

2. The system according to claim 1, wherein said at least one EDFA pump is configured to pump said erbium-doped fiber at a pump power of less than about 400 mW.

3. The system according to claim 1, wherein said transmission path has a length of at least 600 km and spans a body of water.

4. The system according to claim 1, wherein said at least one amplifier comprises a single one of said Raman pumps and a single one of said EDFA pumps.

5. The system according to claim 1, wherein said at least one Raman pump is configured to pump said transmission fiber segment at a wavelength of about 1450 nm and said at least one EDFA pump is configured to pump said erbium-doped fiber at a wavelength of about 980 nm.

6. The system according to claim 1, wherein said gain flattening filter is coupled to an output of said Raman portion through a first isolator and is coupled to an input of said EDFA portion through a second isolator.

7. The system according to claim 1, said system further comprising a remote optical pumped amplifier comprising a doped segment of said transmission path, said doped segment being configured to be pumped by at least one pump to impart gain to at least a portion of said signal bandwidth.

8. The system according to claim 7, wherein said at least one pump comprises said at least one Raman pump.

9. An optical communication system comprising:
   a transmitter configured to transmit an aggregate optical signal comprising plurality of optical signals at different associated wavelengths in a signal bandwidth;
   a receiver configured to receive said aggregate optical signal and detect data modulated on said plurality of optical signals; and
   a transmission path extending between said transmitter and said receiver for length at least 600 km and spanning a body of water, said transmission path comprising,
   a plurality of hybrid Raman/EDFA amplifiers, successive ones of said amplifiers being separated by a transmission span of at least 120 km in length, each of said amplifiers comprising
      a Raman portion comprising a transmission path segment configured to be pumped by at least one Raman pump to impart Raman gain to at least a portion of said signal bandwidth,
      an EDFA portion comprising at least one erbium-doped fiber configured to be pumped by at least one EDFA pump at a pump power of less than about 400 mW to impart EDFA gain to at least a portion of said signal bandwidth, and
      a gain flattening filter coupled between said Raman portion and said EDFA portion of said hybrid Raman/EDFA with no gain flattening filter coupled to an output of said EDFA portion, and
      wherein amplified spontaneous emission (ASE) noise generated by said Raman portion exceeds ASE noise generated by said EDFA portion.

10. The system according to claim 9, wherein each of said amplifiers comprises a single one of said Raman pumps and a single one of said EDFA pumps.

11. The system according to claim 9, wherein said at least one Raman pump is configured to pump said transmission fiber segment at a wavelength of about 1450 nm and said at least one EDFA pump is configured to pump said erbium-doped fiber at a wavelength of about 980 nm.

12. The system according to claim 9, wherein said gain flattening filter is coupled to an output of said Raman portion through a first isolator and is coupled to an input of said EDFA portion through a second isolator.

13. The system according to claim 9, said system further comprising a remote optical pumped amplifier comprising a doped segment of said transmission path, said doped segment being configured to be pumped by at least one pump to impart gain to at least a portion of said signal bandwidth.

14. The system according to claim 13, wherein said at least one pump comprises said at least one Raman pump.

15. A method of amplifying an optical signal to launch the signal on a transmission span of at least 120 km using a hybrid Raman/EDFA amplifier including a Raman gain portion having an output coupled to an input of an EDFA gain portion, said method comprising
   flattening amplifier gain only between the Raman gain portion and the EDFA gain portion of said hybrid Raman/EDFA;
   pumping said EDFA portion at a pump power less than about 400 mW; and
   pumping said Raman portion to achieve an amplifier gain with amplified spontaneous emission (ASE) noise generated by said Raman portion exceeding ASE noise generated by said EDFA portion.

16. The method according to claim 15, wherein said amplifier includes a remote optical pumped amplifier, and wherein said method further comprises pumping said Raman portion and said remote optical pumped amplifier to achieve an amplifier gain with amplified spontaneous emission (ASE) noise generated by said Raman portion and said remote optical amplifier portion exceeding ASE noise generated by said EDFA portion.

17. The system according to claim 1, wherein said gain flattening filter has a transmittance characteristic selected such that amplification of the output of the gain flattening filter by said EDFA portion provides a flattened output of said EDFA portion.

18. The system according to claim 9, wherein said gain flattening filter has a transmittance characteristic selected such that amplification of the output of the gain flattening filter by said EDFA portion provides a flattened output of said EDFA portion.

19. The method according to claim 15, wherein said flattening is provided using a gain flattening filter, and wherein said method further comprises selecting a transmittance characteristic of said gain flattening filter in response to a gain characteristic of said EDFA portion such that amplification of the output of the gain flattening filter by said EDFA portion provides a flattened output of said EDFA portion.

* * * * *